Nov. 25, 1958 T. KÖRNER ET AL 2,861,499

READING DEVICE FOR CHARACTERS REPRESENTED ON A PLATE IN MICRO-REPRODUCTION

Filed Feb. 9, 1955 6 Sheets-Sheet 1

Inventors
Theodor Körner
Wilhelm Friedrich Pohl
by: Michael S. Striker
Attorney

Nov. 25, 1958 T. KÖRNER ET AL 2,861,499

READING DEVICE FOR CHARACTERS REPRESENTED ON A PLATE IN MICRO-REPRODUCTION

Filed Feb. 9, 1955 6 Sheets-Sheet 2

Inventors:
Theodor Körner
Wilhelm Friedrich Poll
by: Michael S. Striker
Attorney Inventors:
Theodor Körner
Wilhelm Friedrich Poll
by: Michael S. Striker
Attorney Inventors.
Theodor Körner
Wichelm Friedrich Poll
by: Michael S. Striker
Attorney Nov. 25, 1958 T. KÖRNER ET AL 2,861,499

READING DEVICE FOR CHARACTERS REPRESENTED ON A PLATE IN MICRO-REPRODUCTION

Filed Feb. 9, 1955 6 Sheets-Sheet 5

Inventors:
Theodor Körner
Wilhelm Friedrich Poll
by: Michael S. Striker
Attorney Inventors.
Theodor Körner
Wilhelm Friedrich Pohl
by: Michael S. Striker
Attorney 2,861,499

READING DEVICE FOR CHARACTERS REPRESENTED ON A PLATE IN MICRO-REPRODUCTION

Theodor Körner, Starnberg, and Wilhelm Friedrich Pohl, Schwabisch Gmund, Germany Application February 9, 1955, Serial No. 487,024

Claims priority, application Germany May 21, 1954

11 Claims. (Cl. 88—39)

This invention relates to a reading device for characters represented on a plate in micro-reproduction.

When working frequently with reference works, tables, time-tables and the like or when being compelled to use dictionaries for reading texts in a foreign language when travelling abroad, it is always felt to be annoying to turn the leaves of a dictionary however small and handy it may be. This fact in many cases paralyses the pleasure of reading literature and of making conversation in a foreign language.

In a similar way difficulties are encountered in reading archive material presented according to the recent practice by micro-reproduction which in general is made readable by magnifying it with a projector. This, however, requires in any case the use of an additional comparatively voluminous apparatus.

To obviate these disadvantages we have developed a reading device which makes looking up in reference works or the like quick and easy and possible with one hand only. Our reading device may be manufactured with any desired dimensions from pocket size up to the dimensions of a desk plate. The invention utilizes the known micro-reproduction of characters on a plate which can be read by means of a reading device. According to the invention elongated track means, preferably in the form of a U-shaped yoke or track member serving to guide the reading lens system in front of the plate and extending over both sides of the plate is designed as a sliding track upon which a lens carrier or a runner together with the lens system can be placed. The elongated track means have a pair of guide portions and at least one connecting portion connecting the guide portions and when the device is mounted on the plate the guide portions will respectively extend parallel to and at least partly over opposite faces of the plate with the connecting portion straddling one edge of the plate. The yoke member is provided with guides such as guiding slots at grooves for the runner. The guide means are preferably provided on both lateral faces of the yoke member and are preferably formed in such a manner as to permit sliding engagement with guiding pins or guiding flanges on the runner. The runner is provided with extensions such as small leaf springs which serve to hold it at a fixed distance from the sliding track in its position of rest without being limited thereby to be moved in lateral direction. Instead of a rigid sliding track also extensible resilient holding strings may be provided surrounding both faces of the plate and enabling the runner to be shifted together with the lens system over both faces of the plate. For this purpose the runner may have eyes, holes or the like in which the holding strings are guided. In order to be able to move the lens system also over larger areas for which the extensibility of the strings is not sufficient, sliders may be provided which are slidable on the edges and embrace them and which have holes or eyes for the holding strings.

The co-operative connection of the lens system with the sliding track may be also in the form of a magnetic coupling by using permanent magnets for the lens runner or for the sliding track or for both. If desired, one or a plurality of magnetizable or non-magnetizable intermediate members may be arranged between the lens runner and the sliding track which intermediate members, if being magnetizable, likewise may be made permanent magnets. To prevent lateral sliding off of the lens runner, guiding grooves or profiled guiding rails may be provided on the sliding track which are capable of being engaged by projections or flanges on the lens runner.

The micro-reproduction may either be applied on both faces of a plate in general by a photochemical procedure or the micro-reproduction may be on foils which are subsequently applied to both faces of the plate.

The plates may have a circular or a polygonal, preferably, however, a circular or a rectangular configuration.

If circular plates are used they are rotatable about an axis. For this purpose the plates may be provided with a hole so as to be rotatable about a pivot. In order to be able to exchange the plates in a quick and simple manner the pivot is secured by a screw which can easily be loosened. Screw and pivot constitute clamping means to clamp the plate together. A particularly simple arrangement is obtained if the same pivot is used to hold the two legs of the yoke member. Under certain circumstances it may be convenient to provide on the pivot of the plate an automatically rotatable winding up spring and in addition to provide on the yoke member brake means for the rotating plate. The edge of the plate may be knurled to obtain a better grip if the plate is to be manually rotated or braked.

Similarly as with the embodiment using a circular plate the micro-reproduction may be placed between two rectangular plates the edges of which are embraced at least at two edges by preferably detachable clamps in particular by frame members acting as clamps clamping means of which one is connected with guiding means for a slider to which the U-shaped yoke member is attached. The clamps or frame may be secured to two opposite edges of the plates but may be arranged also on three adjacent edges of the plate in particular in such a manner that a continuous frame acting as a clamp embraces the plates at three edges at least partially. This frame may be U-shaped both as to its general configuration and in its cross-section. At the clamps or frame the plates may be held together by screws, rivets, clips with or without springs or the like. Thus the guiding rail may be designed as a springy hollow bar the entrance ends of which are flaring to facilitate the insertion of the plates. In order to hold together such portions of the plates which are opposite the frame, pressure members may be provided on the yoke member embracing the plates and serving as a sliding track which pressure members may be secured adjacent the arcuate portion of the yoke member and be provided with springs or not and are acting to urge the plates towards one another.

The lens system of the device may comprise depending upon the magnification desired ordinary lenses, aplanatic lenses or wide angle lenses. For a higher magnification power microscopes can be used. The arrangement may be made such that lenses and microscopes of different magnifying powers are easily interchangeable. Thus an internally cylindrical or conical shaft may be provided on the runner to permit the lenses or microscopes to be easily insertable or removed. The shaft may be provided with guiding eyes with which it may be held displaceable as a runner.

Since a lens or a microscope has a comparatively small visual field it may be desirable to find out prior to reading the approximate reading place on the plate carrying the micro-reproduction. For this purpose a reading lens or less magnifying power may be utilized which can be slipped on the shaft of the lens or microscope with which the reading device is used by means of a suitable clamp spring. To find out the desired reading field quickly the reading lens may be turned around the shaft. Another possibility of attaching the reading lens consists in attaching it by means of a clamping yoke to the U-shaped yoke member serving as a sliding track in such a manner as to be slidable thereon.

The micro-reproductions for the two reading faces are separated from each other by an intermediate space. This intermediate space is occupied by a plate which may either be opaque if it consists of a metal or of another opaque material. The plate may be, however, also translucent so as to constitute between the micro-reproductions on both faces a translucent intermediate layer. The characters being represented in micro-reproduction on both faces of the plate thus have a certain distance from each other which, however, in most cases will not be very important. If the microgram carrier is very thin and clearly transparent it might happen that notwithstanding sharp adjustment of the focal point of the reading lens reading is impaired by the microgram on the opposite face. This is the reason why a thin microgram carrier should either be opaque so that a microgram is observed with impinging light or it should only be translucent such as a focussing screen so that the microgram applied on the other face does not impair reading.

There is still the possibility to use a clearly transparent microgram carrier if it is thick enough that upon observation of the one face of the plate by the lens the opposite face carrying another micro-reproduction appears blurred or out of focus.

These and other features of the invention will appear more fully from the following detailed description of several embodiments thereof in connection with the accompanying drawings given merely by way of example and in which.

Figure 15:
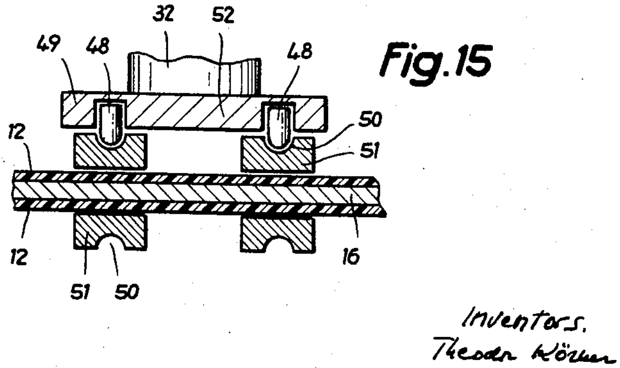
Figure 16:
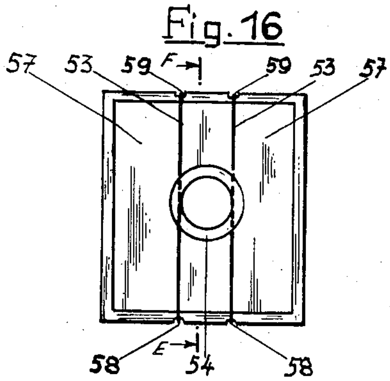
Figure 17:
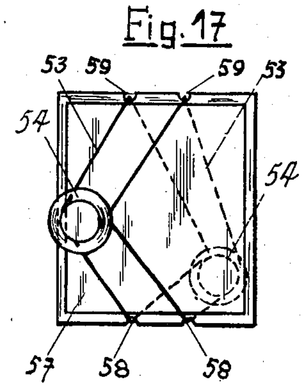
Figure 18:
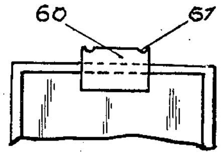
Figure 20:
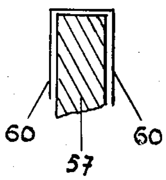
Figure 19:
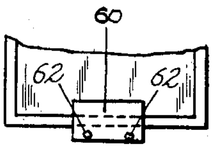
Figure 21:
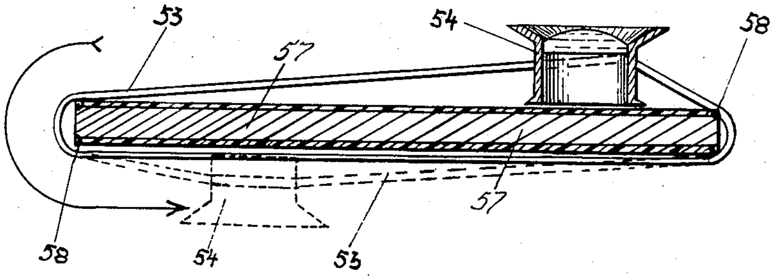
Figure 22:
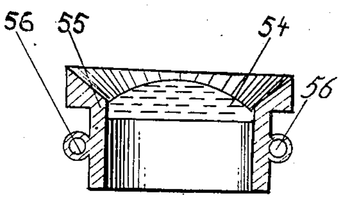
Figure 23:
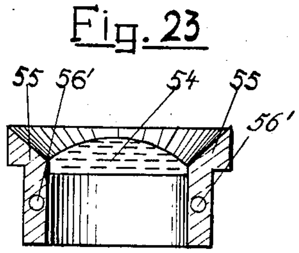
Figure 24:
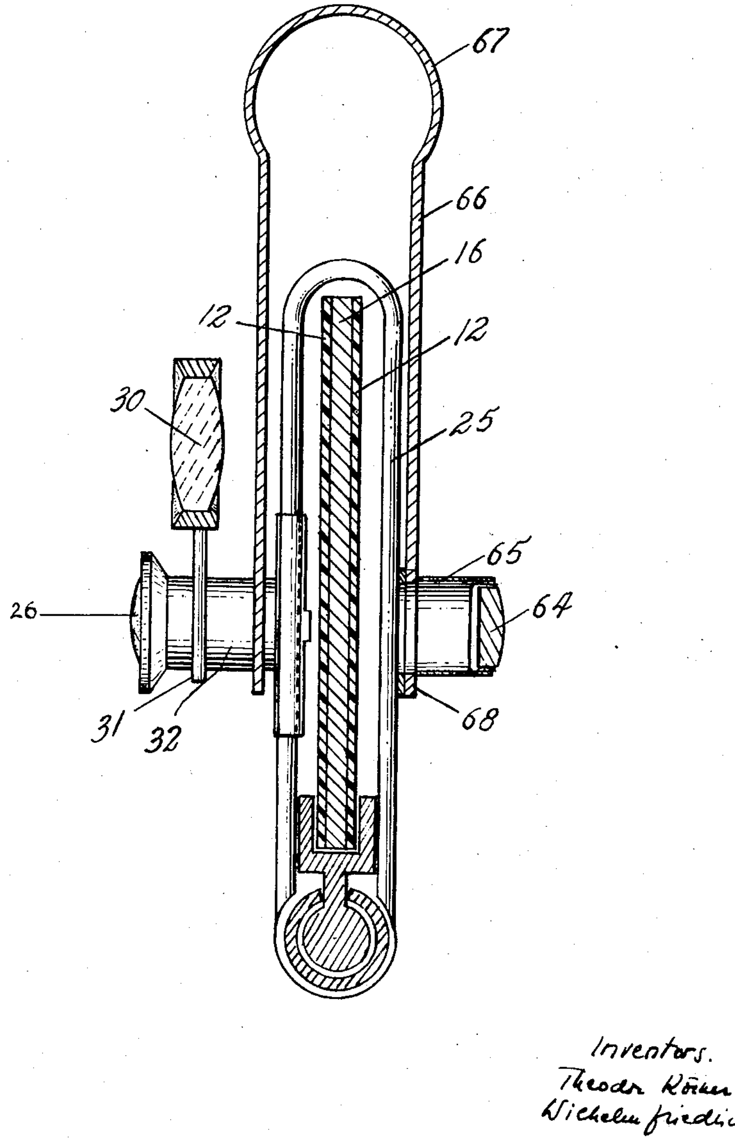

Fig. 15 another magnet connection between lens runner and sliding track in section through a pair of guiding pins, the plane of section being normal to the sliding track;

Fig. 16 shows the use of resilient holding strings instead of a rigid sliding track in their position of rest and Fig. 17 a similar view, however with the strings being extended for reading on a place of the plate which cannot be reached in the position of rest of the string;

Fig. 18 shows a slider attached to the edge of a plate and provided with notches for guiding the resilient strings;

Fig. 19 a corresponding slider, however with holes instead of notches;

Fig. 20 shows in which way the U-shaped slider embraces the edge of the plate;

Fig. 21 is a sectional view and shows the arrangement of the resilient strings of Fig. 16 drawn to an enlarged scale, the section being taken along line E—F of Fig. 16;

Fig. 22 shows a runner cooperating with resilient strings and provided with eyes and Fig. 23 a runner provided with holes through which the resilient strings are passed;

Fig. 24 shows the arrangement of a condenser to improve the illumination of the micro-reproduction to be read off.

Figure 1:
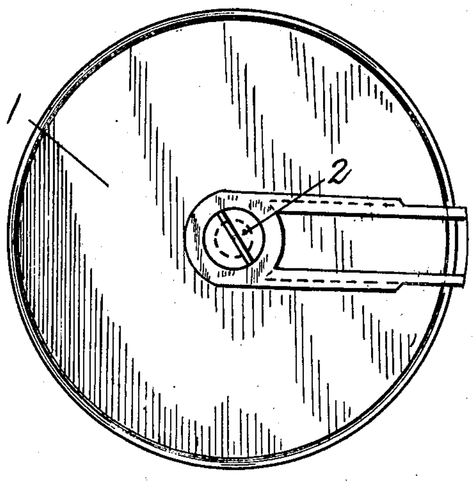
Fig. 1 is a plan view of the device according to the invention in which the circular plate is used.
Figures 2, 3:
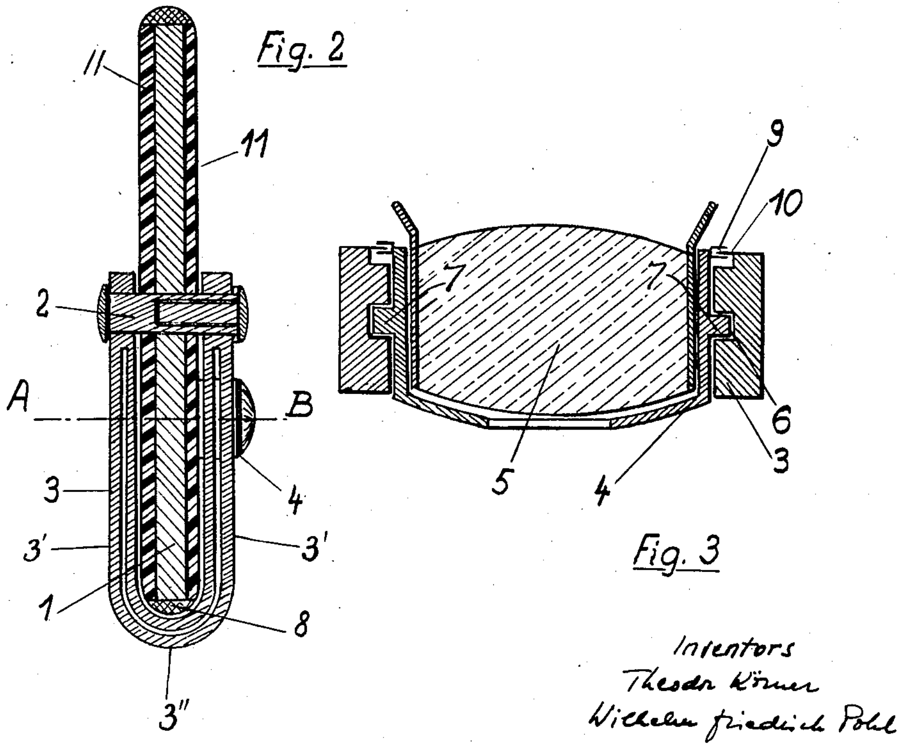
Fig. 2 is a sectional elevational view of the device showing the location of the yoke member.
Fig. 3 is a sectional view taken on the line A—B of Fig. 2.

One embodiment of the present invention shown in Figs. 1–3 comprises a circular plate 1 on both faces of which the complete contents of dictionaries, time tables, map lettering or other records are projected, printed or applied in a photogrammetric manner. In this way it is possible, for instance, to accommodate on one face of a plate having a diameter of about four inches 16,000 catchwords of a pocket dictionary of the height of letters is approximately 6.3 mil, while on the reverse side of the plate further 16,000 words may be placed. The material carrying the micro-reproduction may also be provided on a foil or on a film which is placed between two plates.

A pivot pin 2 extends through the center of plate 1 about which pivot the plate may be rotated. Pin 2 has pivoted thereto a U-shaped track member 3 simultaneously serving as a sliding track for a lens. The U-shaped track member 3 overlies with its legs or guide portions 3′ both faces of the plate 1 and the guide portions 3′ are connected by a connecting portion 3″ which straddles the edge of the plate 1. A runner 4 carrying a lens 5 is slidably attached to the yoke member 3 so as to be movable from the axis of the plate 1 up to its edge and vice versa in a similar manner as the runner of a slide rule. For this purpose both lateral faces of the yoke member 3 are provided each with a guiding slot or guiding groove 6 within which a guide projection 7 of the runner 4 is slidably engaged. The connection between runner 4 and yoke member 3 is such as not to hinder the sliding motion of the runner when changing from one side to the other over the edge 8 of the plate.

In order to prevent the runner from being lifted at one side on shifting by being tilted which would impair the reading by means of the lens, the runner is provided at its ends with a small U-shaped extension 9 at each end in slidable engagement with a flange 10 of the yoke member 3 whereby the runner 4 is safely held on its sliding track. At each side of the yoke member 3 at the location from which the runner 4 is moved with its leading end from the edge of the plate towards the center of the plate, the flanges 10 of the yoke member are shortened by the length of the runner 4.

To facilitate handling of the device the edge 8 of the plate 1 is knurled.

To prevent the micro-reproduction on the plate 1 from being marred it is either provided with a resistant coat of lacquer or covered by two Plexiglas plates 11.

In modification of the construction shown the reading device may also be provided on the pivot pin 2 with a winding-up spring and a braking mechanism (not shown) so that during the use of the device the plate 1 is automatically rotated. In this case a control button should be provided on the yoke member 3 to permit stopping the rotation of the plate in any desired location.

Figure 4:
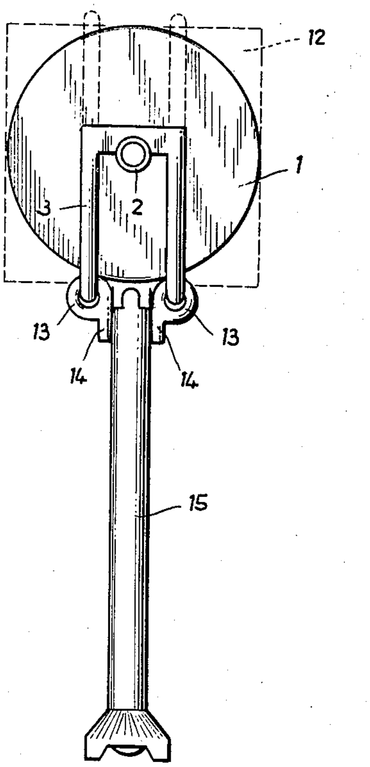
Fig. 4 is a plan view of another embodiment of the invention showing with full lines a circular plate and with dotted lines a rectangular plate and a possibility of attaching a microscope, this latter being illustrated in its position when changing from one face of the plate to the other.
Figure 5:
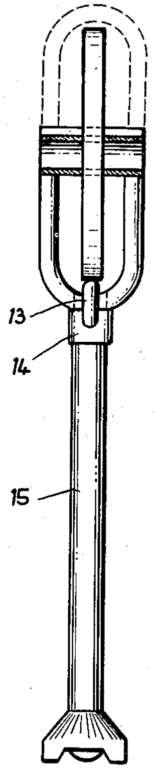
Fig. 5 is a side view of the device shown in Fig. 4.
Figure 6:
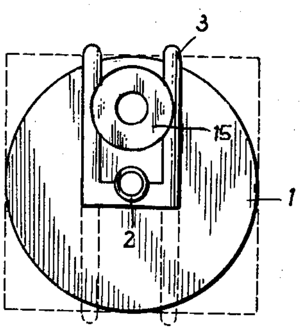
Fig. 6 is a plan view similar to Fig. 4 with the microscope being directed towards the upper face of the plate.

Figs. 4 to 6 show another embodiment of the invention with which a microscope is used. Both a circular plate 1 and a rectangular plate 12 can be used as shown. The circular plate 1 carries a pivot pin 2 on which similar to the embodment shown in Figs. 1 to 3 a yoke member 3 serving as a sliding track is mounted so as to extend over both faces of the plate. The yoke member 3 has slidably attached thereto by means of holding eyes 13 an internally cylindrical or conical shaft 14 into the cylindrical or conical opening of which the shaft 15 of the microscope is insertable. The arrangement may be made such that microscopes of different type and magnifying power or lenses can easily be interchanged. If desired, the yoke member can be made of a springy material so that the objective cone of the microscope is urged with light pressure towards the text-bearing plate in order to give the objective cone the necessary fixed location.

The adjustment of the text-bearing plate to the desired point of observation is effected with the embodiment having a circular plate 1 as described by rotating the sliding track about the pivot 2. With the embodiment having a rectangular plate 12 the yoke member is displaced parallel to one edge of the plate as shown hereinafter in detail by way of example.

Figure 8:
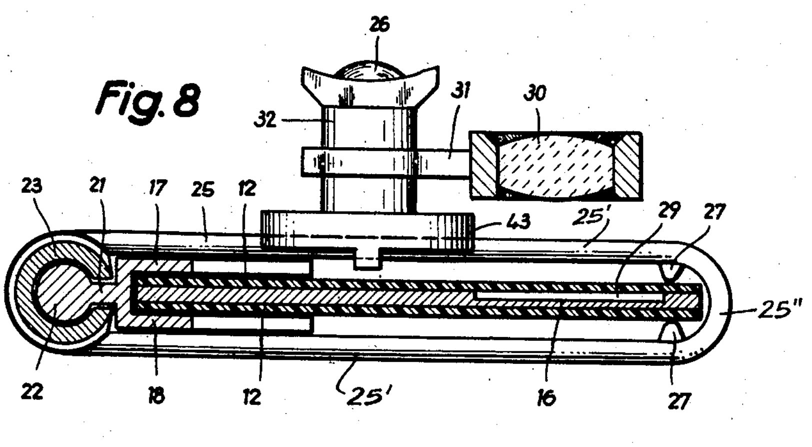
Fig. 8 is a sectional view taken on the line C—D of Fig. 7.

When using a rectangular plate a microgram carrier 16 is held between two transparent plates 12 of glass or plastics (Fig. 8). The microgram carrier has applied to its both faces e. g. by pasting or photographically the micrograms to be read. As already noted the microgram carrier should either be opaque or translucent such as a focussing screen or, if clearly transparent, it should be thick enough that as regards the focal length of the lense the observation of the microgram on one face of carrier is not impaired by the microgram on its other face.

The plates 12 are embraced at three edges by legs 17 and 18 of a frame member or clamping means not only U-shaped in cross section but also in its general configuration (Figs. 7–8). 19 and 20 denote the parallel legs of the U-shaped frame as such. The likewise parallel legs 17 and 18 of the U cross section are at a distance from each other to permit the insertion of the plates 12 holding the microgram carrier 16 between them such that the plates 12 remain at the desired location without, however, rendering the insertion of the plates into the frame difficult. The legs 19 and 20 of the frame member may be made longer or shorter, as desired, or may be so dimensioned that they extend throughout the entire length of the edges. On the other hand it is not necessary that the legs 17 and 18 of the frame member cover the entire length of the edge. It would be sufficient if they have the same length as the legs 19 and 20 measured from the two corners.

The U-shaped frame member completed by the legs 17 and 18 is connected by means of a web 21 to guide means in form of a round bar 22 embraced by a guiding nut 23 by more than 180°. The guiding nut 23 is provided at both of its ends with longitudinal slots 24 assuring a firm however springy guidance of the guiding nut 23 on the round bar 22. The guiding nut 23 further has secured thereto a sliding track 25 designed in the manner described. The reading lens 26 may be directed in the manner likewise described in the foregoing to both faces of the microgram carrier 16 by sliding the lens on the U-shaped yoke member 25.

As the plates 12 are not held by the frame member at their edges opposite the frame member they might have the tendency to separate each other. To prevent this two pressure members 27 are provided the distance between which is equal to the distance between the outer faces of the plates 12. The pressure members 27 are secured to the U-shaped sliding track adjacent its arcuate portion 28.

The inward projection of the pressure members 27 i. e. the distance between them, may be rendered variable by means known as such, e. g. if a film placed between the plates 12 is to be moved for observation, because in this case the pressure between the two plates 12 must not be as high as when observing a stationarily inserted microgram. Alternately also a small recess 29 may be provided in one plate which recess extends throughout the length of the plate and is so dimensioned as to permit the film to be inserted and drawn through.

Since the visual field of an ordinary aplanatic lens is comparatively small it may be replaced by a wide angle lens such as a binocular lens. In case such lenses are not sufficient to permit rapidly looking up the region of the microgram to be observed, view finding lens 30 with less magnifying power and a larger visual field may be employed which is clamped by means of a correspondingly shaped spring onto the shaft 32 of the lens 26. This permits the lens 30 to be rotated about this shaft whereby looking up is greatly facilitated.

In modification of the above the view finding lens 30 may be attached by means of an intermediate web 33 to a spring yoke 34 (Fig. 11) slidably displaceable on the sliding track 25. If the view finding lens 30 is not necessitated it may be removed from the shaft 32 (Fig. 10) or from the sliding track 25 in a simple manner.

The lenses may be provided with eyepiece cups and be made adjustable for focusing.

Figure 7:
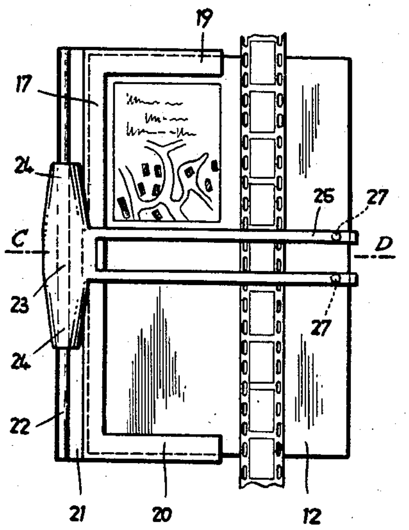
Fig. 7 is a plan view of a rectangular plate provided with a U-shaped frame encompassing the plate on three edges.
Figure 9:
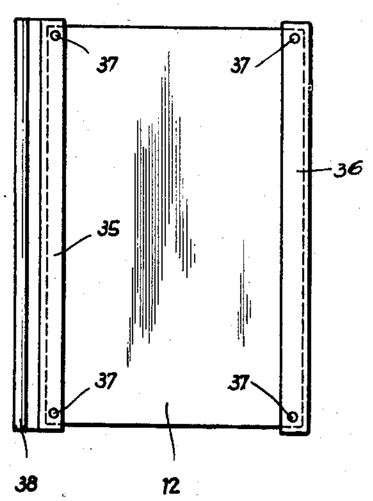
Fig. 9 is a plan view of a plate showing two frame members attached to opposite sides of the plate.

The U-shaped frame member shown in Fig. 7 may be replaced by two clamp-type ledges 35 and 36 secured in opposition to two edges of the rectangular plate (Fig. 9). In case of need these ledges may be fastened to the plates 12 by means of screws, clamps, rivets or the like 37. A guide means in form of a guiding bar 38 for the slider is provided on one of the two ledges.

Our novel device permits of quickly and simply interchanging of micrograms of all kinds in the reading device. For exchanging a microgram by another first the guiding nut 23 together with the elongated track means in the form of the U-shaped track member 25 is removed from the round bar 22. The U-shaped track member 25 has similar as the member 3, a pair of guide portions or leg portions 25′ located respectively on opposite sides of the plate and a connecting portion 25″ straddling one edge thereof. Then the plates 12 are withdrawn from the frame together with the micrograms held between them whereupon the micrograms are removed from between them and replaced by new ones. This having been done the plates are again inserted together with the micrograms into the frame member and then the guiding nut 23 is again slipped onto the round bar 22 whereupon the device is again ready for reading.

Figure 12:
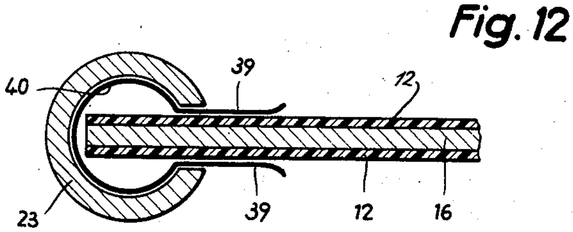
Fig. 12 shows a springy lateral frame used for holding the plates with one embodiment and Fig. 13 another embodiment of the arrangement shown in Fig. 12.
Figure 13:
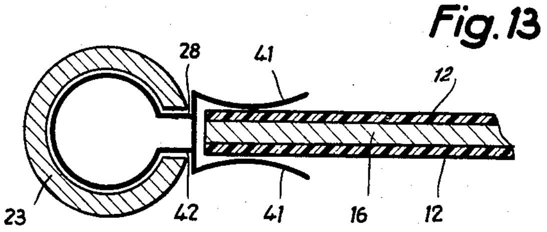

The cross sections of two frame members which have probed to be particularly useful in practice are shown in Figs. 12 and 13. Fig. 12 shows a frame member comprising two opposite springy legs 39 which can be formed simply by bending a metal bar. The free ends of the legs are bent so as to be flaring. After the plates 12 holding the microgram carrier between them are removed from this frame the two legs 39 more or less approach each other under the action of their own elasticity. The flaring configuration of the two free ends facilitates the insertion of the plates. The guide nut 23 is slidably mounted in the manner described hereinbefore on the inner portion 40 of the frame of approximately circular cross section.

While the embodiment shown in Fig. 12 is characterized by an increased stability it involves, however, a greater loss in the useful space of the plates 12 which useful space is larger with the embodiment shown in Fig. 13. In the latter case the free legs 41 of the frame are provided with a throat 42 limiting the movement of insertion of the plates 12. The free legs 41 also in this case are biased towards one another so that they approach each other after removal of the plates 12 and firmly hold the plates inserted between them.

The lens carrier or runner 43 (Fig. 8) on the one hand must have sufficient clearance for being easily movable on the sliding track 25 but on the other hand it must have an invariable distance from the object after having been focussed to an object in order to permit the focal point of the reading lens 26 to be exactly adjusted to the microreproduction. These contradictory requirements may be met with by a spring such as a leaf spring provided within the lens runner.

Another possibility consists in providing a magnetic connection between the lens runner and the sliding track. For this purpose either the lens runner 44 or the sliding track 45 or both may be made permanent magnets. If only one of these two elements is a permanent magnet the other must be of a magnetizable material. The lens runner may be displaced along the sliding track without this movement being hindered by the magnetic attraction and is held firmly and without clearance on the sliding track which permits a very exact adjustment of the focal point to the microgram. To prevent the lens runner from being lost or from being laterally displaced also in this case laterally embracing flanges 46 are provided engaging with corresponding slide bars or projections 47 of the sliding track.

Instead of using permanent magnetic material for the lens runner or for the sliding track it is also possible, if the sliding track is magnetizable, to provide on the lens runner magnetizable or permanent magnetic intermediate members 48, e. g. in recesses 49 of the lens runner (Fig. 15). These intermediate members 48 are guided in grooves 50 of the sliding track 51.

Figure 14:
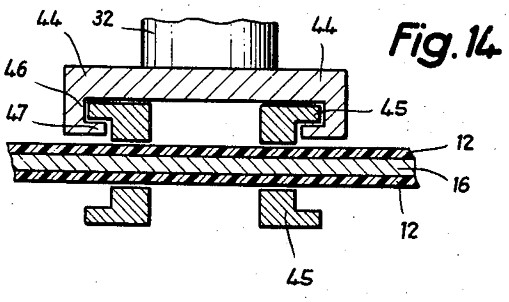
Fig. 14 shows a magnetic connection between lens runner and sliding track.

If the lens runner or the sliding track is magnetizable and one of these two elements is a permanent magnet, the intermediate members 48 need not be magnetizable or be permanent magnets. This arrangement assures not only a safe adjustment of the focal point of the lens to the microgram but also proper lateral guidance of the lens runner 52 on the sliding track without it being necessary to provide lateral projections or flanges on the lens runner and without the provision of lateral guiding rails on the sliding track. In view of the fact that the magnetic force is acting only on a comparatively reduced distance it may be convenient even when intermediate pieces are used to provide lateral guiding flanges and projections such as 46 and 47, as shown in Fig. 14.

A very simple and inexpensive holding and guiding device for the lens is illustrated in Figs. 16 to 23. In this embodiment extensible resilient holding and guiding strings 53 which form elongated track means are substituted for the previously described rigid yoke-shaped sliding track. These holding or guiding strings have attached thereto the lens for the microscope 54 in such a manner that it can be laterally displaced. To this end the lens is inserted into a lens runner 55 which is provided either with eyes 56 or with holes 56′ through which the resilient guiding strings extend.

This arrangements permits to displace the lens in the direction of the resilient guiding strings from one edge of the plate 57 to its other edge.

For displacing the lens transversely to the direction of the guiding strings 53 it will be sufficient to exert a lateral pressure on the lens runner 55 for displacing the lens up to the desired point. Owing to the elasticity of the guiding strings 53 the lens may be directed to any point of the reading field.

The holding strings may be arranged to extend over the plate 57 either in its longitudinal direction or in its transverse direction. At the same time the holding strings are urging the lens runner 55 towards the plate 57 so that the lens has always the same invariable working distance from the micro-reproduction.

The guiding strings can be secured to the one edge of the plate by means of knots or the like in holes 58, while at the opposite edge of the plate 57 they are guided in two notches or recesses 59 in such a manner that they will not be displaced laterally. For bringing the lens 54 to the other face of the plate 57 it will do to lift the guiding strings 53 by means of the lens runner 55 out of their recesses 59 and to shift the lens runner 55 to the other face.

Instead of providing recesses 59 of invariable location, U-shaped sliders 60 may be used which embrace the edge of the plate 57 and are provided with notches 61 or holes 62, in which or through which the resilient guiding strings 53 are guided. This permits to displace the guiding elements of the guiding strings 53 on one of two opposite edges of the plates 57 or on both opposite edges in such a manner that for observing any place on the plate only a slight resilient elongation of the guiding strings 53 is necessary or no elongation at all so that the lens 54 may be immobilized at any desired location without being compelled to hold it.

The elastic guiding strings may be of any suitable elastic material such as rubber cords, rubber bands, strings of plastic, covered or uncovered spiral springs or the like.

Also with this embodiment an intermediate plate 16 may be provided between the two protecting covering plates 12 consisting e. g. of Plexiglas as shown f. i. in Fig. 24. This intermediate plate may be as mentioned hereinabove of an opaque or a translucent material or, if of sufficient thickness, of a transparent material.

Figure 10:
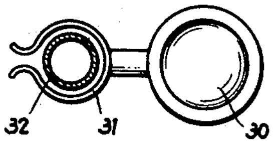
Fig. 10 shows in diagrammatic manner a view finder lens attached to the tube of the reading lens.
Figure 11:
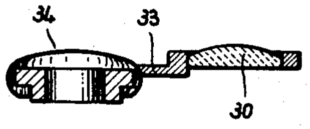
Fig. 11 shows in which manner the view finder lens may be shiftably attached to the U-shaped yoke member.

The magnification of the micro-reproduction on observation by means of a lens in particular on observation by means of a mricroscope the light intensity of the observed space is reduced. This implies the possibility that, if the illumination of the surroundings is poor, the micro-reproduction becomes illegible. This can be avoided by using a condenser lens arranged opposite the reading lens or microscope at the other face of the plates if these plates are translucent or transparent as shown in Fig. 24. The embodiment of Fig. 24 shows a condenser lens 64 mounted in a tube or the like 65 secured to a clamping yoke 66 the other end of which can be clamped in a similar way to the shaft 32 of the lens or to the tube 15 of the microscope such as shown in Figs. 10 and 11 for the view finding lens. The arcuate portion of the clamping yoke 66, formed of two substantially parallel leg portions 68 and a curved connecting portion 67, has been placed far enough outwardly to permit the condenser together with the lens to be moved over the entire surface of the plate 12. This arrangement assures that the condenser is in any position of rest opposite the lens or the microscope and always lights up the corresponding visual field of the microscope even when the condenser is directed towards a comparatively poor source of light. The clamping yoke may be given a slight elastic bias so that the base of the condenser is always slightly urged against the sliding track 25 in order to prevent undesired movement of the condenser lens and accordingly variations of the illumination of the visual field.

We claim:

1. A reading device for reading micro reproductions located on opposite faces of a plate comprising, in combination, elongated track means having a pair of guide portions and at least one connecting portion connecting said guide portions, said track means adapted to be mounted on the plate with said guide portions respectively extending substantially parallel to and at least partly over opposite faces of the plate and said connecting portion straddling one edge of the plate when said track means are mounted on the plate; a len carrier slidably mounted on said elongated track means for sliding movement along said guide portions and said connecting portion thereof; and lens means mounted on said lens carrier, whereby said lens carrier may be moved along said track means from one face of the plate to the other face thereof so that micro reproductions on either side of the plate may be read through said lens means.

2. A reading device for reading micro reproductions located on opposite faces of a plate comprising in combination, clamping means adapted to be mounted on the plate; elongated track means having a pair of guide portions and at least one connecting portion connecting said guide portions, said track means mounted on said clamping means with said guide portions respectively extending substantially parallel to and at least partly over opposite faces of plate and said connecting portion straddling one edge of the plate when said clamping means are mounted on the plate; a lens carrier slidably mounted on said elongated track means for sliding movement along said guide portions and said connecting portion thereof; and lens means mounted on said lens carrier, whereby said lens carrier may be moved along said track means from one face of the plate to the other face thereof so that micro reproductions on either side of the plate may be read through said lens means.

3. A reading device for reading micro reproductions located on opposite faces of a plate comprising, in combination, elongated clamping means adapted to be mounted on the plate extending along one side edge thereof; guide means on said clamping means; elongated track means having a pair of guide portions and at least one connecting portion connecting said guide portions, said track means mounted on said clamping means with said guide portions respectively extending substantially parallel to and at least partly over opposite faces of the plate and said connecting portion straddling one edge of the plate when said clamping means are mounted on the plate, said track means being operatively connected to said guide means for guiding said guide portions respectively over the opposite faces of the plate; a lens carrier slidably mounted on said elongated track means for sliding movement along said guide portions and said connecting portion thereof; and lens means mounted on said lens carrier, whereby said lens carrier may be moved along said track means from one face of the plate to the other face thereof so that micro reproductions on either side of the plate may be read through said lens means.

4. A reading device for reading micro reproductions located on opposite faces of a plate comprising, in combination, clamping means adapted to be mounted on the plate; a U-shaped track member having a pair of leg portions and a connecting portion connecting said leg portions, said leg portions being at the free ends thereof operatively connected to said clamping means for movement of said leg portions respectively over opposite faces of said plate with said connecting portion straddling one edge of the plate when said clamping means are mounted on the plate; a lens carrier slidably mounted on said U-shaped track member for sliding movement along said leg portions and said connecting portion thereof; and lens means mounted on said lens carrier, whereby said lens carrier may be moved along said U-shaped track member from one face of the plate to the other face thereof so that micro reproductions on either side of the plate may be read through said lens means.

5. A reading device for reading micro reproductions comprising, in combination, a plate assembly having a center plate and a pair of cover plates respectively extending over opposite surfaces of said center plate, at least said cover plates being made from transparent material, said plate assembly adapted to carry micro reproductions sandwiched between said center plate and said cover plates; clamping means for clamping said plates together; elongated track means having a pair of guide portions and at least one connecting portion connecting said guide portions, said track means movably mounted on said clamping means for movement of said guide portions substantially parallel to and over the outer planar surfaces of said cover plates, respectively, with said connecting portion straddling one edge of said plate assembly; a lens carrier slidably mounted on said elongated track means for sliding movement along said guide portions and said connecting portions thereof; and lens means mounted on said lens carrier and facing one of said cover plates, whereby said lens carrier and said lens means mounted thereon may be moved along said track means from a position where said lens means faces said one cover plate to a position where said lens means faces the other of said cover plates so that micro reproductions located on either side of said center plate may be read through said lens means.

6. A reading device for reading micro reproductions comprising, in combination, a plate assembly having a center plate and a pair of cover plates respectively extending over opposite surfaces of said center plate, at least said cover plates being made from transparent material, said plate assembly adapted to carry micro reproductions sandwiched between said center plate and said cover plates; elongated clamping means for clamping said plates together and extending along at least one edge portion of said plate assembly; guide means extending longitudinally along said clamping means; a U-shaped track member having a pair of leg portions respectively extending along the outer surfaces of said cover plates and substantially normal to said one edge portion between said one edge portion and the other edge portion of said plate assembly, said track member having a connecting portion connecting said leg portions and straddling said other edge portion of said plate assembly, said track member being movably connected at the free ends of said leg portions thereof to said guide means for movement over said plate assembly; a lens carrier slidably mounted on said U-shaped track member for sliding movement along said leg portions and said connecting portions thereof; and lens means mounted on said lens carrier and facing one of said cover plates, whereby said lens carrier and said lens means mounted thereon may be moved along said U-shaped track member from a position where said lens means faces said one cover plate to a position where said lens means faces the other of said cover plates so that micro reproductions located on either side of said center plate may be read through said lens means.

7. A reading device for reading micro reproductions comprising, in combination, a circular plate assembly having a circular center plate and a pair of circular cover plates respectively extending over opposite surfaces of said center plate, each of said plates being formed with a central hole, at least said cover plates being made from transparent material, said plate assembly adapted to carry micro reproductions sandwiched between said center plate and said cover plates; a pivot pin mounted in said central holes of said plates and extending therethrough and having opposite end portions projecting respectively beyond the outer surfaces of said cover plates; a U-shaped track member having a pair of leg portions respectively extending along the outer surfaces of said cover plates, said track member having a connecting portion connecting said leg portions and straddling the circumferential edge portion of said plate assembly, said track member being movably connected at the free ends of said leg portion thereof to said opposite end portions of said pivot pin, respectively, for movement over said plate assembly; a lens carrier slidably mounted on said U-shaped track member for sliding movement along said leg portions and said connecting portions thereof; and lens means mounted on said lens carrier and facing one of said cover plates, whereby said lens carrier and said lens means mounted thereon may be moved along said U-shaped track member from a position where said lens means faces said one cover plate to a position where said lens means faces the other of said cover plates so that micro reproductions located on either side of said center plate may be read through said lens means.

8. A reading device for reading micro reproductions comprising, in combination, a plate assembly having a center plate and a pair of cover plates respectively extending over opposite surfaces of said center plate, at least said cover plates being made from transparent material, said plate assembly adapted to carry micro reproductions sandwiched between said center plate and said cover plates; clamping means for clamping said plates together; elongated track means having a pair of guide portions and a pair of connecting portions connecting said guide portions and straddling opposite edge portions of said plate assembly, said elongated drive means being formed by a pair of elongated members formed from resilient material, said track means mounted on said clamping means for movement of said guide portions substantially parallel to and over the outer planar surfaces of said cover plates, repsectively; a lens carrier slidably mounted on said elongated track means for sliding movement along said guide portions and said connecting portions thereof: and lens means mounted on said lens carrier and facing one of said cover plates, whereby said lens carrier and said lens means mounted thereon may be moved along said track means from a position where said lens means faces said one cover plate to a position where said lens means faces the other of said cover plates so that micro reproductions located on either side of said center plate may be read through said lens means.

9. A reading device for reading micro reproductions comprising, in combination, a plate assembly having a center plate and a pair of cover plates respectively extending over opposite surfaces of said center plate, at least said cover plates being made from transparent material, said plate assembly adapted to carry micro reproductions sandwiched between said center plate and said cover plates; clamping means for clamping said plates together; elongated track means having a pair of guide portions and at least one connecting portion connecting said guide portions, said track means being formed from magnetic material, said track means movably mounted on said clamping means for movement of said guide portions substantially parallel to and over the outer planar surfaces of said cover plates, respectively, with said connecting portion straddling one edge of said plate assembly; a lens carrier formed from magnetizable material and being slidably mounted on said elongated track means for sliding movement along said guide portions and said connecting portions thereof, whereby said lens carrier is held in position by magnetic force on said track means; and lens means mounted on said lens carrier and facing one of said cover plates, whereby said lens carrier and said lens means mounted thereon may be moved along said track means from a position where said lens means faces said one cover plate to a position where said lens means faces the other of said cover plates so that micro reproductions located on either side of said center plate may be read through said lens means.

10. A reading device for reading micro reproductions comprising, in combination, a plate assembly having a center plate and a pair of cover plates respectively extending over opposite surfaces of said center plate, at least said cover plates being made from transparent material, said plate assembly adapted to carry micro reproductions sandwiched between said center plate and said cover plates; elongated clamping means for clamping said plates together and extending along at least one edge portion of said plate assembly; guide means extending longitudinally along said clamping means; a U-shaped track member having a pair of leg portions respectively extending along the outer surfaces of said cover plates and substantially normal to said one edge portion between said one edge portion and the other edge portion of said plate assembly, said track member having a connecting portion connecting said leg portions and straddling said other edge portion of said plate assembly, said track member being movably connected at the free ends of said leg portions thereof to said guide means for movement over said plate assembly; a lens carrier slidably mounted on said U-shaped track member for sliding movement along said leg portions and said connecting portions thereof; and lens means mounted on said lens carrier and facing one of said cover plates, said lens means comprising a reading lens and a view finding lens mounted for turning about the axis of said reading lens, whereby said lens carrier and said lens means mounted thereon may be moved along said U-shaped track member from a position where said lens means faces said one cover plate to a position where said lens means faces the other of said cover plates so that micro reproductions located on either side of said center plate may be read through said lens means.

11. A reading device for reading micro reproductions comprising, in combination a plate assembly having a center plate and a pair of cover plates respectively extending over opposite surfaces of said center plate, said plates of said plate assembly being made from transparent material, said plate assembly adapted to carry micro reproductions sandwiched between said center plate and said cover plates; elongated clamping means for clamping said plates together and extending along at least one edge portion of said plate assembly; guide means extending longitudinally along said clamping means; a U-shaped track member having a pair of leg portions respectively extending along the outer surfaces of said cover plates and substantially normal to said one edge portion between said one edge portion and the other edge portion of said plate assembly, said track member having a connecting portion connecting said leg portions and straddling said other edge portion of said plate assembly, said track member being movably connected at the free ends of said leg portions thereof to said guide means for movement over said plate assembly; a lens carrier slidably mounted on said U-shaped track member for sliding movement along said leg portions and said connecting portions thereof; and lens means comprising a reading lens mounted on said lens carrier and facing one of said cover plates, and a condenser lens located opposite said reading lens and facing the other of said cover plates, said condenser lens being operatively connected to said reading lens for simultaneous movement therewith, whereby said lens carrier and said lens means mounted thereon may be moved along said U-shaped track member from a position where said lens means faces said one cover plate to a position where said lens means faces the other of said cover plates so that micro reproductions located on either side of said center plate may be read through said lens means.

References Cited in the file of this patent

UNITED STATES PATENTS

| | | |
|---|---|---|
| 7,961 | Nystrom | Mar. 4, 1851 |
| 443,359 | Duncan | Dec. 23, 1890 |
| 533,324 | Stevens | Jan. 29, 1895 |
| 540,184 | Norris | May 28, 1895 |
| 1,007,760 | Williams | Nov. 7, 1911 |
| 2,127,711 | Baldauf | Aug. 23, 1938 |
| 2,166,988 | Fosdick | July 25, 1939 |
| 2,533,628 | Rosenberg | Dec. 12, 1950 |
| 2,556,806 | Gaire | June 12, 1951 |